Sept. 9, 1958        H. POMERNACKI        2,850,806
AUTOMATIC GEAR CHECKING APPARATUS
Filed May 27, 1954        2 Sheets-Sheet 1
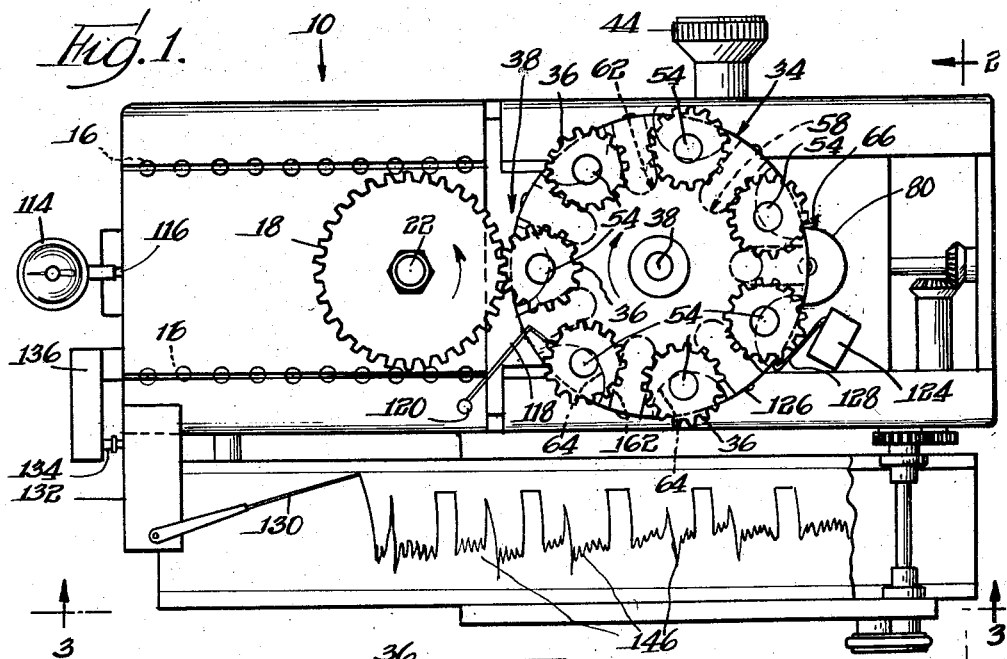
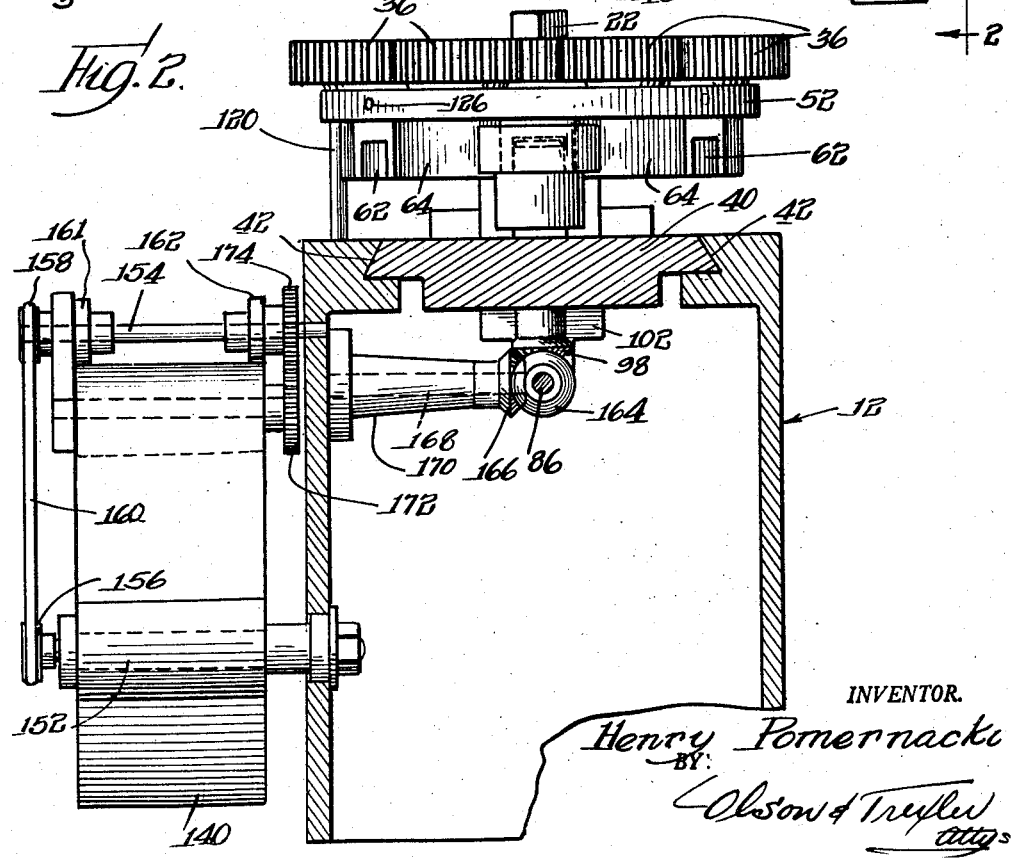
INVENTOR.
Henry Pomernacki Sept. 9, 1958  H. POMERNACKI  2,850,806
AUTOMATIC GEAR CHECKING APPARATUS
Filed May 27, 1954  2 Sheets-Sheet 2
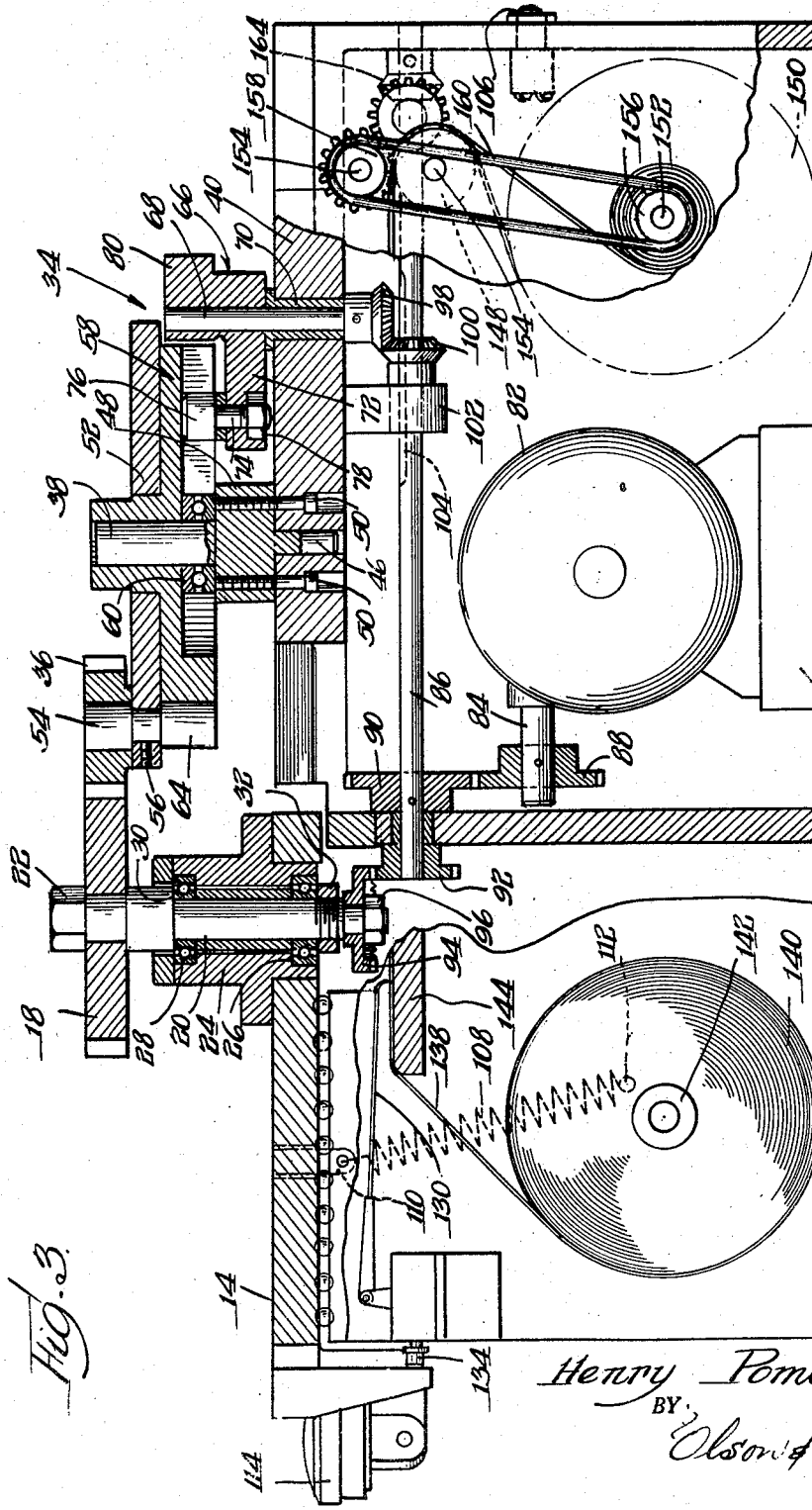
INVENTOR.
Henry Pomernacki
BY
Olson & Trexler
attys.

United States Patent Office 2,850,806
Patented Sept. 9, 1958

2,850,806

AUTOMATIC GEAR CHECKING APPARATUS

Henry Pomernacki, Chicago, Ill., assignor to Illinois Tool Works, Chicago, Ill., a corporation of Illinois Application May 27, 1954, Serial No. 432,864

6 Claims. (Cl. 33—179.5)

The present invention relates to a novel apparatus for checking gears and like toothed articles and more particularly to a novel apparatus for checking gears as to run out tooth spacing and tooth profile.

With gear checking apparatus now in general use it is necessary for an an operator to mount each gear to be checked in the apparatus, then actuate the apparatus and then dismount the checked gear. This procedure is relatively slow and cumbersome and requires the operator to attend to the checking apparatus at all times. It is, therefore, a primary object of the present invention to provide a novel gear checking apparatus which is capable of checking a plurality of gears automatically in a rapid and efficient manner so that the operator may leave the checking apparatus during the checking operation to attend to other duties, whereby the cost of the gear checking operation may be substantially reduced.

A more specific object of the present invention is to provide a novel checking apparatus for gears and like toothed articles, which apparatus is capable of automatically conveying a plurality of articles to be checked to a checking station and then checking the articles without requiring the attention of an operator between each checking operation.

Another object of the present invention is to provide a novel checking apparatus of the type mentioned above wherein means is provided for indicating to an operator who has left the apparatus during the checking operation, which of the checked gears is acceptable and which of the checked gears is unacceptable.

A further object of the present invention is to provide a novel checking apparatus of the above described type which is of simple and rugged construction and which does not require the employment of a skilled operator.

Other objects and advantages of the present invention will become apparent from the following description and the accompanying drawings wherein:

Fig. 1 is a plan view of an apparatus embodying the principles of this invention;

Fig. 2 is an enlarged cross sectional view taken along line 2—2 in Fig. 1;

Fig. 3 is an enlarged view partially in cross section along the line 3—3 in Fig. 1; and Fig. 4 is an enlarged fragmentary perspective view of an element of the novel apparatus.

Referring now more specifically to the drawings wherein like parts are designated by the same numerals throughout the various figures, an apparatus 10 embodying the principles of this invention includes a base structure generally designated by the numeral 12. Adjacent one end of the base structure a carriage block 14 is slidably supported by a plurality of ball bearings 16. The carriage block 14 supports a master gear 18 which is adapted to mesh with and check workpiece gears as will be understood. More specifically, the master gear 18 is fixed on a spindle 20 by means including a nut member 22, which spindle extends through the bore of a bearing housing 24 mounted on the carriage block 14. Suitable anti-friction or ball bearing units 26 and 28 are disposed within the bearing housing for rotatably supporting the spindle. The spindle is provided with an annular shoulder 30 for engaging the bearing unit 28 to retain the spindle against downward vertical movement and a nut member 32 is positioned on the spindle for engagement with the bearing unit 26 to prevent raising of the spindle.

In accordance with the present invention the apparatus 10 is provided with conveyor or turret means 34 adapted to support a plurality of workpieces or gears 36 and successively advance the gears 36 to a checking station 38. The turret means 34 includes a shaft 38 that is carried by a slide plate 40 mounted in suitable guide grooves formed in the base structure 12. The distance between the turret means and the master gear spindle may be varied so that the apparatus can accommodate workpieces and master gears of different diameters and this can be accomplished through the use of suitable rack and gear means, not shown, which may be actuated by the knob 44 shown in Fig. 1. The shaft 38 includes a pin portion 46 which projects into a suitable aperture in the slide plate 40, and an enlarged diameter portion 48 that rests on the slide plate. A plurality of screw members 50 extend through the slide plate and are threaded into the enlarged diameter portion 48 for retaining the shaft 38 in position. In order to support a plurality of workpieces or gears 36 the turret means is provided with a disc 52, which disc carries a plurality of spaced stub shafts 54 locked in position by set screws 56. As will become more apparent from the description hereinbelow, the disc 52 is intermittently rotated to advance the workpieces to the checking position and this is accomplished by means of a Geneva drive mechanism including a disc 58 rotatably mounted on the shaft 38 and supported by an anti-friction bearing unit 60. The disc 52 is disposed on and fixed to the disc 58 by suitable key or screw means, not shown, so that the two discs move in unison. The disc 58 of the Geneva drive mechanism is essentially of well known construction and includes a plurality of slots 62 adapted to receive a driving element and a plurality of peripheral pockets 64 adapted to receive a locking element. In order to drive the discs 58, a member 66 is fixed on a shaft 68 journaled in a bearing 70 mounted in the slide plate 40. The member 66 includes an arm portion 72 carrying a pin 74, which pin has a roller 76 mounted thereon for entry into the slots 62 of the disc 58. The pin 74 is retained in assembled relationship with the arm by means of a nut 78. The member 66 also has a rounded portion 80 adapted to enter the pocket 64 on the disc 58 and lock the disc against rotation as will be understood.

The apparatus 10 is provided with means for driving the master gear and the turret in timed relationship whereby to effect rapid and automatic checking of all of the workpieces or gears carried by the turret. This drive means is shown best in Figs. 2 and 3 and includes a reversible electric motor 82 having an output shaft 84. A main drive shaft 86 is journaled in the base structure by suitable bearing means and is driven from the shaft 84 through gears 88 and 90. Another gear 92 is pinned or keyed to the drive shaft 86 for meshing engagement with a crown gear 94 fixed on the lower end of the master gear spindle 20 by means including a nut 96. With this arrangement it will be appreciated that the carriage 14 may move back and forth the necessary amount during the checking operation without interrupting the meshing relationship between the gear 92 and the crown gear 94. The shaft 68 of the Geneva drive mechanism carries a beveled gear 98 at its lower end, which gear is driven by another beveled gear 100 slidably keyed on the drive shaft 86. It should be noted, that the gear 100 is trapped between the gear 98 and a lug 102 depending from the slide plate 40 so that upon adjustment of the slide plate 40 the gear 100 moves therewith. The lug 102 is provided with an aperture which slidably receives the drive shaft 86, and the drive shaft is provided with an elongated keyway 104 in order to permit adjustment of the gear 100 along the shaft. As will be understood, the speed with which the master gear and turret means are rotated may be easily varied by changing the sizes of the above described gears of the drive mechanism. However, the speed of rotation of the master gear should be such that a workpiece gear being checked is rotated one complete revolution before the turret is indexed.

In order to check a plurality of gears the apparatus thus far described, a workpiece gear is, of course, first mounted on each of the stub shafts 54 of the turret. Then the motor 82 is energized by pressing a suitable pushbutton switch 106 shown in Fig. 3 so that the master gear is continuously rotated and the turret is intermittently indexed to bring each of the workpiece gears 36 to the checking station. The master gear is resiliently urged into meshing engagement with the workpiece gear at the checking station by means of a tension spring 108 connected to the carriage block 14 by means of a pin 110 and also connected to a fixed pin 112, see Fig. 3. Thus, as the master gear and the workpiece gear are rotated together any inaccuracies in the workpiece gear will cause the carriage 14 to move either toward or away from the workpiece. This movement may be indicated by means of a dial indicator 114 which is suitably mounted to the fixed base structure 12 and which includes a spring-biased plunger 116 disposed to be actuated by the carriage 14. In order to insure that the workpiece gear 36 being advanced to the checking station during indexing of the turret will mesh with the master gear, means is provided for turning this workpiece gear. As shown in Figs. 1 and 4 this means includes a spring member 118 mounted on a fixed post 120 and having a hooked end portion 122 disposed to engage the advancing workpiece gear. As the workpiece gear advances past the spring member 118 to the checking position the hook spring portion 122 engages the teeth of the gear and causes the gear to turn so that it will easily slip into meshing relationship with the master gear.

In order to permit the checking operation of all of the gears on the turret to proceed automatically after the motor has been energized, the apparatus 10 is provided with means for stopping the motor after the turret has rotated one revolution and means for recording the results of the check made on each of the workpiece gears. These means enable an operator to leave the apparatus while the checking operation is going on in order to service another checking apparatus or perform any other required duties. The means for stopping the motor includes a suitable switch 124 of known construction which is electrically connected with the motor circuit. As shown best in Fig. 1 a finger or cam 126 is mounted on the turret and projects therefrom for actuating an arm 128 of the switch once during each revolution of the turret.

The means for recording the results of the checking operation includes a marking pen 130 actuated by a mechanism of known construction disposed within a housing 132. The pen actuating mechanism includes a spring-biased plunger 134 which yieldably engages an arm 136 fixed on the carriage block 14 so that the plunger 134 and the marking pen are actuated in accordance with any movement of the carriage block. An elongated strip 138 of chart paper is fed from a supply roll 140 mounted on a shaft 142 over a table 144 and beneath the marking pen. The chart paper is fed by means presently to be described in timed relationship with the movement of the turret so that a series of relatively short graphs 146 are formed thereon by the marking pen. Each of the graphs will, of course, indicate the results of the checking operation for a particular workpiece gear so that an operator returning to the checking apparatus may readily determine from the series of graphs which of the gears are acceptable and which are unacceptable.

The strip of chart paper is wrapped around a roller 148 and then wound on a roll 150 which is mounted on a driven shaft 152. This shaft is driven from a second shaft 154 journaled above the table 144 and the roller 148 by means of pulley wheels 156 and 158 and a belt 160. The shaft 154 also has mounted thereon a pair of feed rolls 161 and 162 which engage and feed the chart paper over the roller 148. In order to feed the chart paper in timed relationship with the movement of the turret, suitable means is provided for driving the shaft 154 from the shaft 86. This means includes a beveled gear 164 mounted on the shaft 86 and meshing with a beveled gear 166 mounted on a shaft 168 journaled in a sleeve 170 fixed on the base structure. On the opposite end of the shaft 168 there is fixed a gear 172 which meshes with a gear 174 mounted on the shaft 154.

From the above description it is seen that the present invention has provided a novel gear checking apparatus which enables a plurality of gears or similar workpieces to be automatically checked without requiring the constant attention of an operator, whereby the cost of the overall checking operation may be substantially reduced. More specifically, it is seen that the present invention has provided a novel apparatus which is capable of automatically conveying a plurality of gears or like workpieces to a checking station whereat each gear is automatically checked in a rapid and economical manner. In addition, it is seen that the apparatus of this invention is provided with simple means for recording or memorizing the results of each individual checking operation so that an operator may easily determine which of the gears or workpieces are acceptable and which should be rejected.

While the preferred embodiment of the present invention has been shown and described herein it is obvious that many structural details may be changed without departing from the spirit and scope of the appended claims.

The invention is claimed as follows:

1. An apparatus for checking gears and like workpiece members comprising conveyor means including a plurality of spaced shaft elements for engaging and rotatably supporting a plurality of peripherally toothed workpiece members and successively advancing the workpiece members to a checking station, a master gear supporting element disposed adjacent said checking station for supporting a master gear member adapted to roll in meshing relationship with a workpiece member on a conveyor means support element adjacent and paired with said master gear support element for checking the workpiece member, means for positively rotating one of said paired support elements and the member thereon, the other of said paired support elements being adapted to support a member thereon so as to be driven by the member on the driven support element, means for imparting initial rotative movement to the other of said paired support elements prior to the checking operation for facilitating initial meshing engagement between the workpiece member and the master gear member, and means mounting said master gear support element and said conveyor means for relative movement toward and away from each other in response to any change in the meshing relationship between a master gear member and a workpiece member as a result of any inaccuracy in the workpiece.

2. An apparatus for checking gears and like workpieces comprising conveyor means including an endless series of spaced generally upstanding shaft means for freely supporting a plurality of workpieces for rotation about their respective axes and for successively advancing the workpieces to a checking station, means for rotatably supporting a workpiece checking master gear means adjacent said checking station for meshing engagement with successive workpieces, means for driving said master gear means in meshing relationship with successive workpieces, means mounting said conveyor means and said master gear means supporting means for relative movement toward and away from each other in response to any change in the meshing relationship of the master gear means and an associated workpiece, and means for imparting rotative movement to a workpiece on said conveyor means in advance of and approaching said checking station to facilitate initial meshing engagement between said last mentioned workpiece and the master gear means.

3. An apparatus as claimed in claim 2, wherein the means for imparting rotative movement to the workpiece on the conveyor means comprises a member biased toward the path of travel of the workpieces for resilient and releasable engagement with each successive workpiece.

4. An apparatus as claimed in claim 3, wherein the biased member comprises a spring arm mounted adjacent the conveyor means.

5. An apparatus as claimed in claim 2, wherein the conveyor means for the workpieces is intermittently stopped with each workpiece at the checking station to permit rotation thereof relative to the conveyor means.

6. An apparatus as claimed in claim 1, wherein the master gear support element is mounted for floating relative movement toward and away from the conveyor means, and wherein there is provided recording means mounted for movement with said master gear support element to reflect movement thereof with respect to each workpiece.

References Cited in the file of this patent

UNITED STATES PATENTS

| | | |
|---|---|---|
| 2,317,559 | Stout | Apr. 27, 1943 |
| 2,355,092 | Meister | Aug. 8, 1944 |
| 2,356,236 | Gagne | Aug. 22, 1944 |
| 2,447,445 | Widen | Aug. 17, 1948 |
| 2,531,317 | Baney | Nov. 21, 1950 |
| 2,542,090 | Lorenz | Feb. 20, 1951 |
| 2,556,413 | Boosey | June 12, 1951 |
| 2,651,412 | Aller | Sept. 8, 1953 |
| 2,697,879 | Tandler | Dec. 28, 1954 |